Nov. 11, 1969  B. T. HERBST  3,477,215
COMBINED CROP SHAKER AND HARVESTER
Filed Jan. 10, 1967  6 Sheets-Sheet 1

INVENTOR.
BENJAMIN T. HERBST
BY
Lothrop & West
ATTORNEYS

INVENTOR.
BENJAMIN T. HERBST
BY
Lothrop & West
ATTORNEYS

Nov. 11, 1969  B. T. HERBST  3,477,215
COMBINED CROP SHAKER AND HARVESTER
Filed Jan. 10, 1967  6 Sheets-Sheet 4
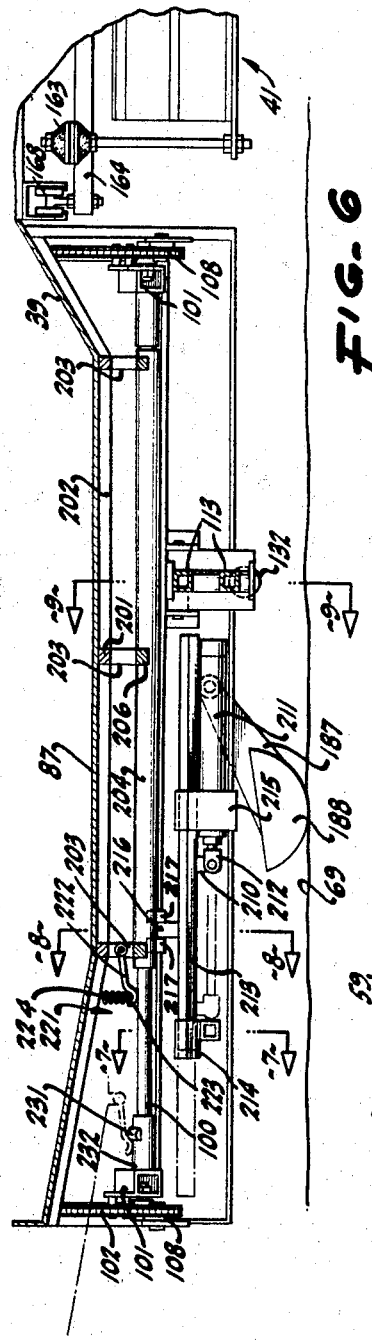
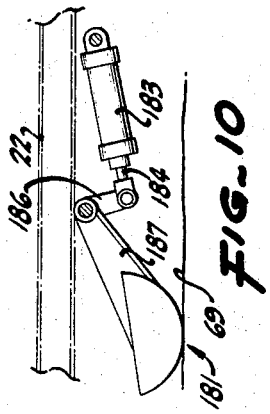
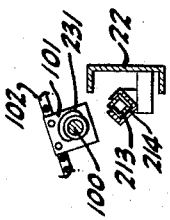
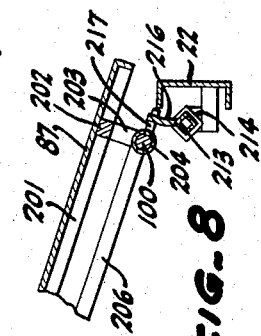
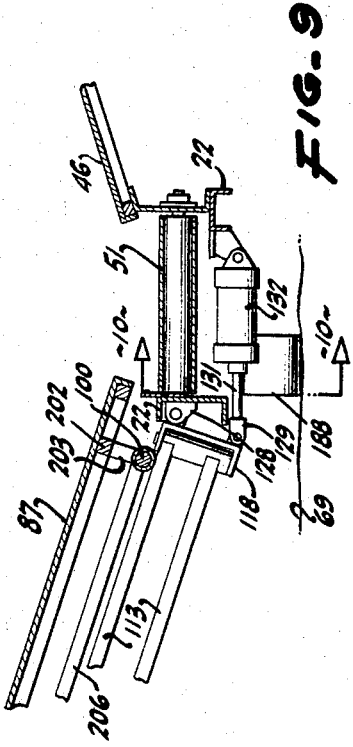
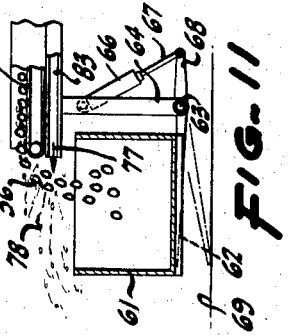
INVENTOR.
BENJAMIN T. HERBST
BY
Lothrop & West
ATTORNEYS Nov. 11, 1969  B. T. HERBST  3,477,215
COMBINED CROP SHAKER AND HARVESTER
Filed Jan. 10, 1967  6 Sheets-Sheet 5
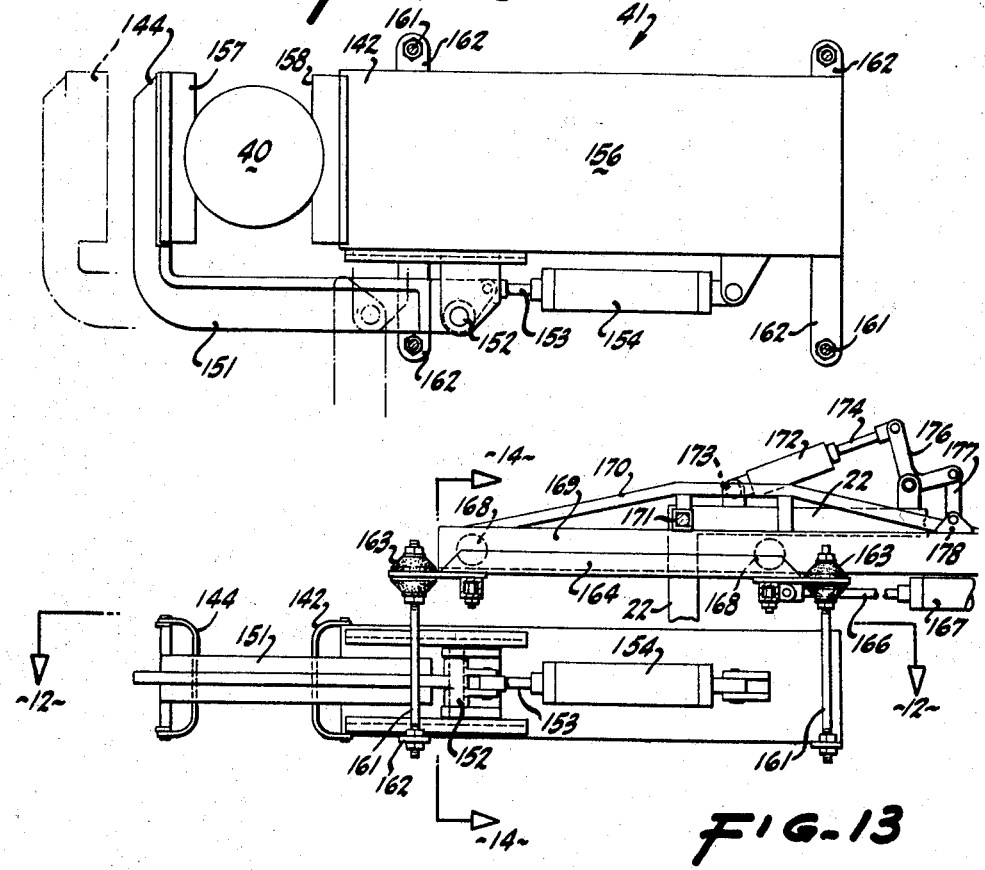
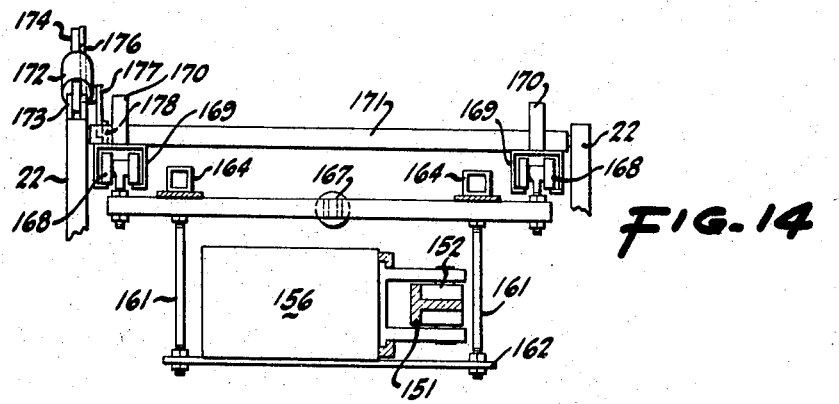
INVENTOR.
BENJAMIN T. HERBST
BY
*Lothrop & West*
ATTORNEYS Nov. 11, 1969   B. T. HERBST   3,477,215
COMBINED CROP SHAKER AND HARVESTER
Filed Jan. 10, 1967   6 Sheets-Sheet 6

INVENTOR.
BENJAMIN T. HERBST
BY
Lothrop & West
ATTORNEYS

United States Patent Office 3,477,215
Patented Nov. 11, 1969

3,477,215
COMBINED CROP SHAKER AND HARVESTER
Benjamin T. Herbst, P.O. Box 67, Esparto, Calif. 95627
Filed Jan. 10, 1967, Ser. No. 608,410
Int. Cl. A01d *41/02;* A01g *19/00*
U.S. Cl. 56—328        9 Claims

ABSTRACT OF THE DISCLOSURE

The disclosure relates to self-propelled apparatus movable alongside a row of crop bearing trees and being capable of stopping at each tree, shaking the tree and catching the entire crop shaken therefrom.

---

The invention relates to improvements in devices of the nature shown and described in my Patent No. 3,145,521, dated Aug. 25, 1964, for Self-Propelled Fruit Catching Apparatus, and my Patent No. 3,121,304, dated Feb. 18, 1964, for Tree Shaker.

It is an object of the invention to provide a combined crop shaker and harvester which is self-contained in that the unit possesses all the capabilities necessary to move the device to an orchard, to proceed along the tree rows and to shake and harvest the crop from the individual trees.

It is another object of the invention to provide a unitary shaker and harvester unit which affords a catching frame substantially underlying an entire tree out to the drip line.

It is a further object of the invention to provide an apparatus which greatly speeds up and simplifies the harvesting of a tree crop.

It is still a further object of the invention to provide a harvester which ordinarily requires only one person for its operation.

It is another object of the invention to provide a generally improved combined shaker and harvester.

Other objects, together with the foregoing, are attained in the embodiment described in the following description and shown in the accompanying drawings, in which:

FIGURE 6 is a fragmentary side elevational view, partially in section, and to an enlarged scale, of a wing fore and aft translating structure, the plane of the section being indicated by the line 6—6 in FIGURE 2;

FIGURE 7 is a fragmentary sectional view taken on the line 7—7 in FIGURE 6;

FIGURE 8 is a fragmentary sectional view taken on the line 8—8 in FIGURE 6;

FIGURE 9 is a fragmentary sectional view taken on the line 9—9 in FIGURE 6;

FIGURE 10 is a fragmentary sectional view taken on the line 10—10 in FIGURE 9;

FIGURE 11 is a fragmentary sectional view taken on the line 11—11 in FIGURE 4;

FIGURE 12 is a fragmentary top plan view, to an enlarged scale, of the shaker, the view being taken on the line 12—12 in FIGURE 13;

FIGURE 13 is a fragmentary side elevational view, to an enlarged scale, of the shaker and shaker positioner;

FIGURE 14 is a fragmentary sectional view of the shaker positioner taken on the line 14—14 in FIGURE 13;

Figure 1:
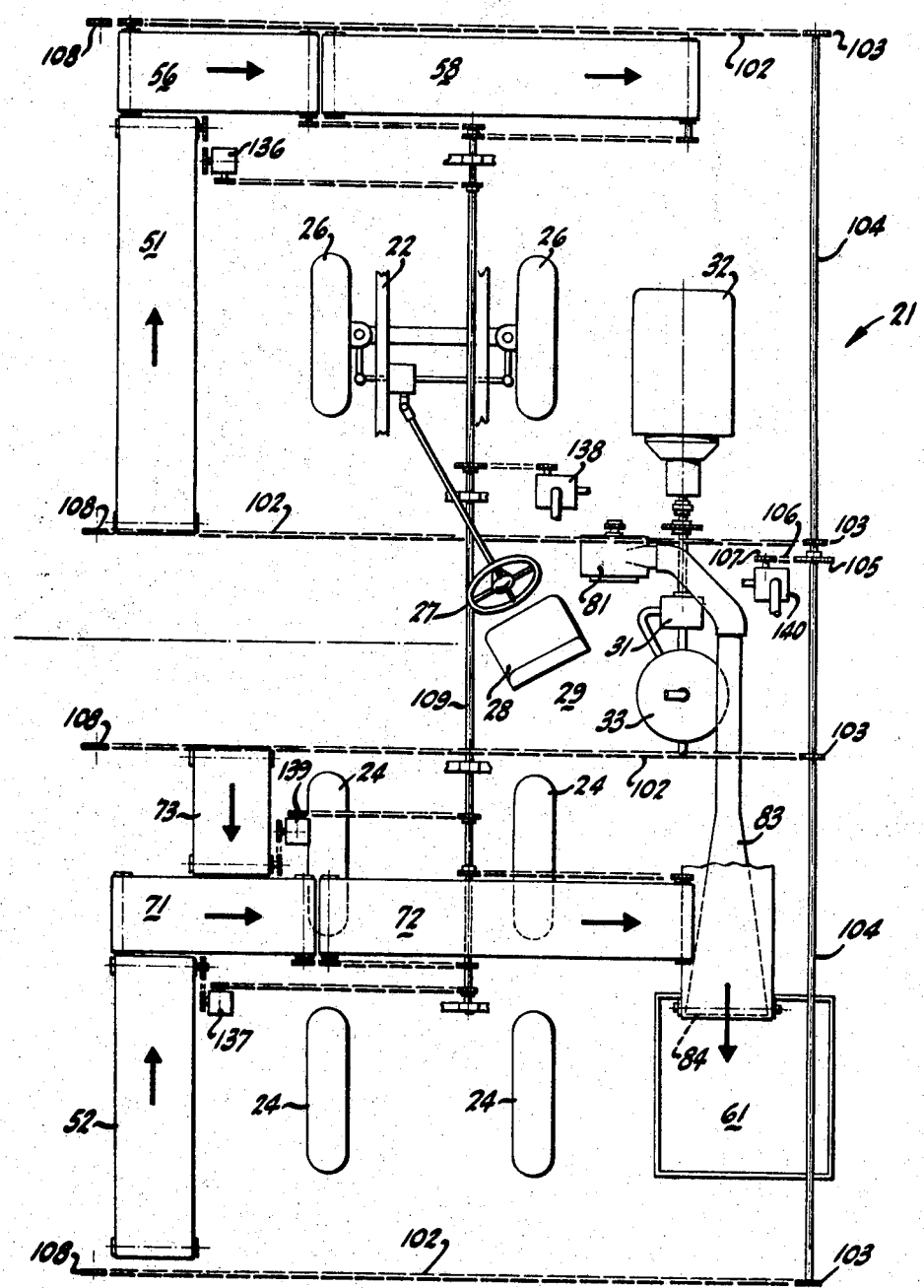
FIGURE 1 is a fragmentary top plan view of the vehicle framework and portions of the attendant crop handling and power machinery.

While the combined crop shaker and harvester of the invention is susceptible of numerous physical embodiments, depending on the environment and requirements of use, the herein shown and described embodiment has been extensively tested and used and has performed most satisfactorily.

The apparatus of the invention, generally designated by the reference numeral 21, comprises an elongated framework 22 appropriately supported on a plurality of ground engaging wheels 24 including a pair of front wheels 26 steerable by a steering wheel 27 located adjacent a seat 28 in the operator's station 29, or cockpit. At a convenient position in the cockpit 29 is a console 30 (see FIGURE 2) providing the control levers required by the operator to effect remote control operation of the device.

Preferably, various of the operating components are actuated by conventional hydraulic means including a pump 31 (see FIGURE 1) driven by an internal combustion engine 32 and connected to a hydraulic fluid reservoir 33. Suitable conduits (not shown) lead from the pump 31 to appropriately located hydraulic motors, as at 138 and 140. Other components are operated by suitable chain, sprocket and gear drivers as at 136 and 137. The vehicle itself can, if desired, be propelled by a separate prime mover, not shown.

The vehicle propulsion and steering system, as well as the various hydraulic actuating means, do not comprise the essential subject matter of the present invention and are therefore neither shown nor described in detail.

Figure 2:
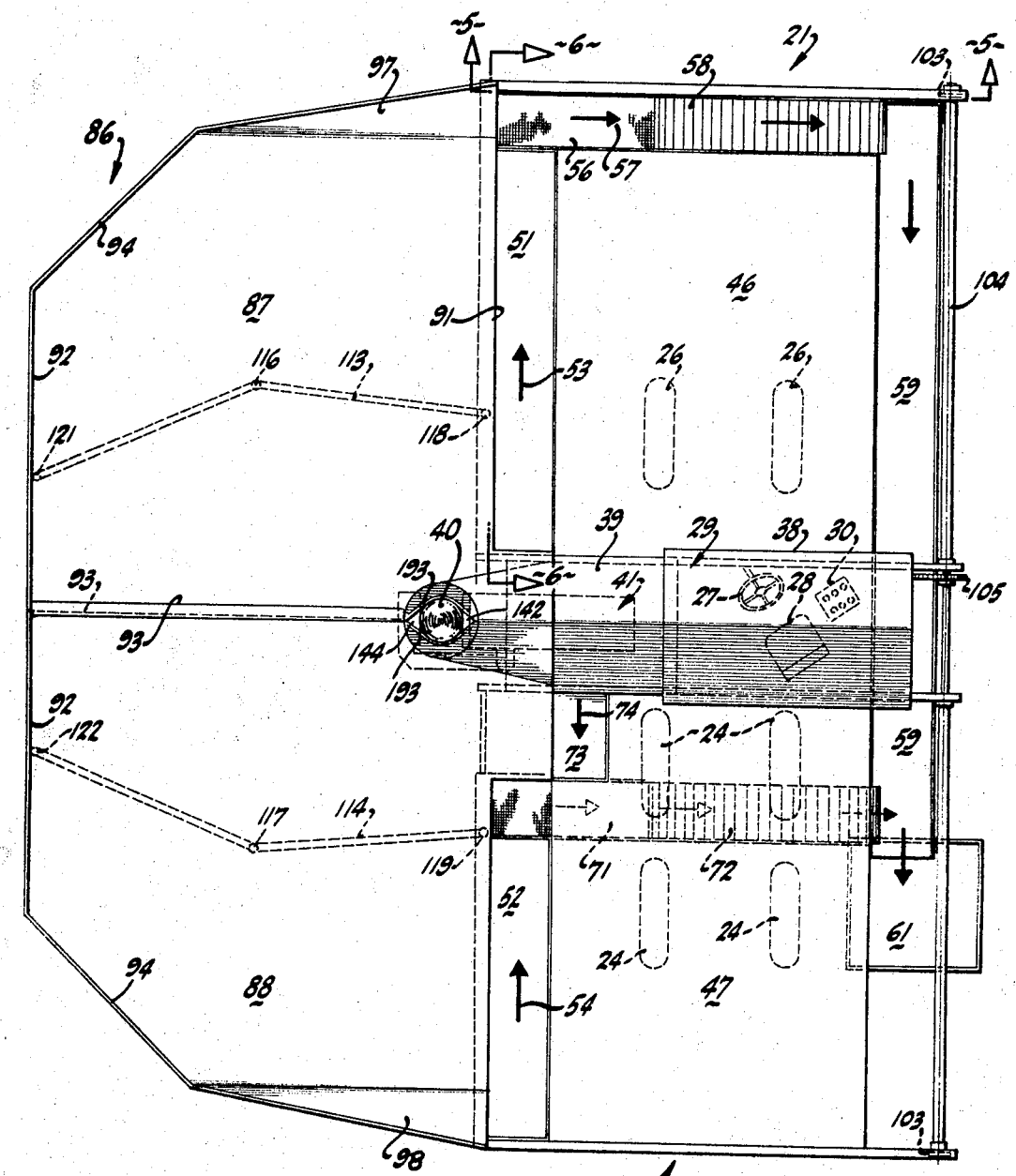
FIGURE 2 is a top plan view showing the device with the tree-encompassing wings in a laterally extended and longitudinally engaged position.

As appears most clearly in FIGURES 1 and 2, the operator's station 29 is located substantially centrally, longitudinally, of the apparatus, and in order to protect the operator from the crop 36 (see FIGURE 3) falling from the tree 37, an inverted, V-shaped canopy 38 is suitably mounted on the vehicle frame 22 so as to overlie the operator's station and thus afford a protective umbrella.

In substantial transverse alignment with the operator's canopy 38 is a second inverted V-shaped canopy 39, or shield, inclined downwardly toward the tree trunk 40 (see FIGURE 3), the shield 39 protecting the underlying shaker mechanism 41 (see FIGURE 2) from the falling crop 36.

The apparatus is useful in harvesting a wide variety of crops, examples being walnuts, almonds, pecans, macadamia nuts, prunes, apricots and peaches, among others.

The operator's canopy 38 and the shaker canopy 39 form a portion of a stationary crop shedding, or crop directing, apron, generally designated by the reference numeral 44, overlying substantially the entire framework.

The stationary apron 44 includes ahead of the central transverse canopies 38 and 39, a stationary front apron portion 46, and aft of the canopies 38 and 39, a stationary rear apron portion 47. The aprons 46 and 47 form, with the central canopies 38 and 39 an elongated, generally laterally tilted surface adapted to intercept the falling crop and to direct the crop toward the lower, left hand margin (see FIGURES 2 and 3) of the apron 44 and onto longitudinal crop conveyors 51 and 52 movable in the direction of the arrows 53 and 54, respectively. The conveyor 51 is driven by the gear drive 136 and the conveyor 52 by the gear drive 137, both of which, in turn, are driven by the hydraulic motor 138 and the shaft 109.

Figure 4:
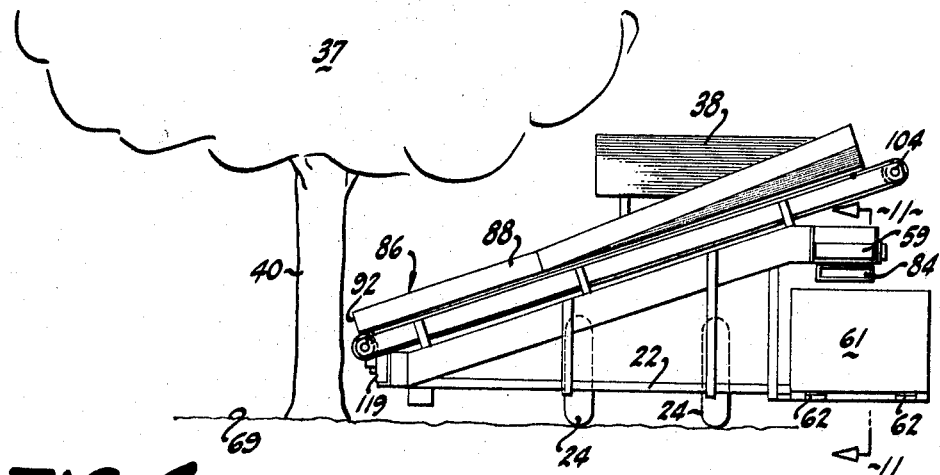
FIGURE 4 is a rear elevational view as in FIGURE 3, but illustrating the wings in retracted position.

The forward conveyor 51 moves forwardly and discharges onto a transverse conveyor 56, the crop being carried thereby in the direction of the arrow 57 (see FIGURE 2) onto an elevator 58, thence onto a rearwardly moving conveyor 59 to discharge into a bin 61 supported on a longitudinal fork 62 pivotally mounted on the framework (see FIGURES 4 and 11).

More specifically, the fork 62 is mounted for rocking movement about a pivot pin 63 secured to a framework strut 64 (see FIGURE 11). The fork 62 is selectively positioned by a hydraulic cylinder 66 pivoted on the strut 64 and a plunger 67 pivotally mounted on a forward extension 68 of the fork. When the bin 61 becomes filled, the fork is tilted downwardly to touch the ground 69, as appears in outline in FIGURE 11, thus sliding the bin 61 onto the ground for subsequent pick up by a fork lift or other bin collecting vehicle.

That portion of the crop which falls on the after apron 47, and rolls onto the after conveyor 52, moves forwardly and discharges onto a transverse conveyor 71, thence up an elevator 72 and onto the high conveyor 59, there joining the crop received from the forward apron 46 and dropping into the bin 61 as previously described.

An auxiliary longitudinal conveyor 73, driven by the drive 139 connected to the rotating shaft 109, moves rearwardly in the direction of the arrow 74, and thus assists in directing the off-flow from the canopies 38 and 39 onto the transverse conveyor 71.

Advantage is taken of the fact that the crop 36 discharging from the rearwardly moving high conveyor 59 into the bin 61 undergoes a short distance of free fall (see FIGURE 11). By directing an air blast in the rearward direction indicated by the arrow 77 across the fall path, a substantial quantity of unwanted trash material 78, such as leaves, dust, twigs etc. is blown rearwardly over the top of the bin to fall to the ground, thus providing a very desirable preliminary cleaning effect.

The air blast 77 is provided by a blower 81 (see FIGURE 1) driven by a chain and sprocket connection to the engine shaft. From the blower 81, the air passes through a conduit 83, thence outwardly through a discharge nozzle 84 (see FIGURE 1) directed horizontally, at right angles to the path of crop fall (see FIGURE 11).

In addition to the laterally inclined fixed apron 44 underlying approximately one half the tree 37, means are also afforded for catching the crop falling from the other portion, or other side, of the tree.

Inclusive of such means is a pair of laterally movable, longitudinally translatable and upwardly titlable catching members, collectively designated by the reference numeral 86, comprising a forward wing 87 and an after wing 88.

Each of the wings 87 and 88 is substantially identical to the other, the wings being arranged in substantial mirror symmetry about a transverse central partition line.

A description of one wing will therefore serve equally to describe the other.

Figure 15:
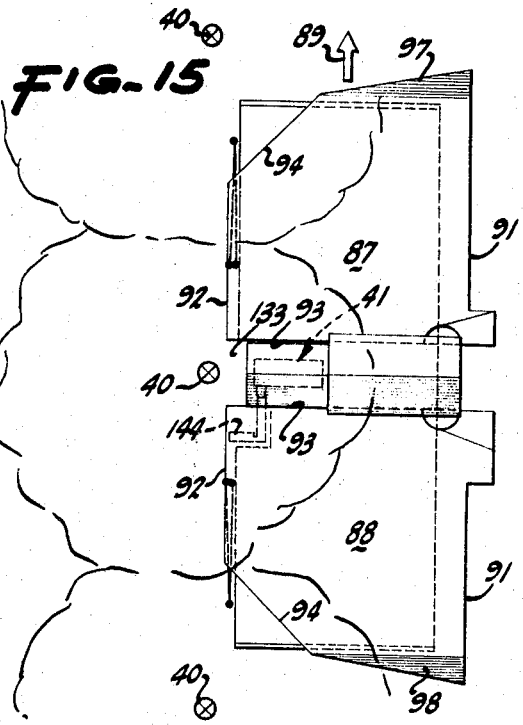
FIGURE 15 is a partially schematic illustration of the apparatus located alongside a tree preparatory to extending the wings and positioning the shaker.

During the forward movement of the vehicle, in the direction of the arrow 89 in FIGURE 15, as along a highway, or roadway, or in progressing along a tree row from tree to tree, the wings 87 and 88 are in the laterally retracted position shown in FIGURES 4 and 15, with the wings 87 and 88 overlying the inclined, stationary apron 44.

Each of the wings 87 and 88 is roughly square in plan, including (see FIGURES 2 and 15) a longitudinal near side 91, or base side, a longitudinal far side 92, or nether side, and a transverse edge 93. The remote corners are preferably beveled, as at 94. In order to provide increased catching surface, the forwardmost portion of the leading wing 87 is provided with a triangular extension 97 and the aftermost portion of the trailing wing 88 is provided with a triangular extension 98.

When the wings are in their fully laterally retracted position, as shown most clearly in FIGURE 15, the wings 87 and 88 are longitudinally separated, the distance between the adjacent transverse edges 93 of the wings being spaced apart a distance 133 somewhat in excess of the maximum expected diameter of the tree trunk 40 to be met with.

In this longitudinally separated position of the wings 87 and 88, the triangular wing extensions 97 and 98 extend somewhat beyond the respective ends of the vehicle framework, as is shown in FIGURE 15. When, however, the wings have been drawn together longitudinally, preparatory to shaking the tree, the adjacent transverse edges 93 are in juxtaposed position and in fact are in slightly overlapping relation, as appears in FIGURES 2 and 18, and the tips of the triangular extensions 97 and 98 are substantially coextensive with the ends of the stationary apron 44.

Figure 5:
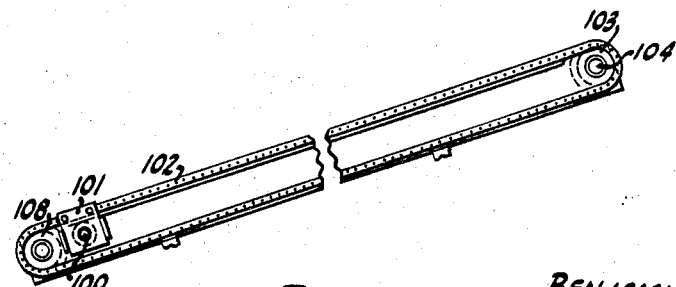
FIGURE 5 is a fragmentary sectional view, to an enlarged scale, of one of the four wing extending and retracting structures, the plane of the section being indicated by the line 5—5 in FIGURE 2.

Lateral movement of each of the wings 87 and 88 is afforded by a pair of traveling blocks 101 (see FIGURE 5) to which a longitudinal rod 100 along the base edge of the wing is attached. Each of the blocks 101 is secured to a corresponding chain run 102 driven by a drive sprocket 103 mounted on a longitudinal shaft 104 (see FIGURE 1) rotated by a sprocket 105 connected by a chain 106 to a sprocket 107 driven by the hydraulic motor 140. An idler sprocket 108 carries the chain on the lower end (see FIGURE 5) and the block 101 translates between the sprockets 103 and 108 in dependence upon the operator's control over the hydraulic motor 140, the wings 87 and 88 moving accordingly, between fully laterally extended and fully laterally retracted positions.

As the two wings 87 and 88 are urged into extended position by movement of the four traveling blocks 101, the first portion of the wings which comes into contact with the ground 69 is a pair of dirigible type wheels 112 (see FIGURE 3) mounted adjacent the outer edge 92 of each of the wings the wheels supporting the wing tips as the wings move laterally.

Figure 17:
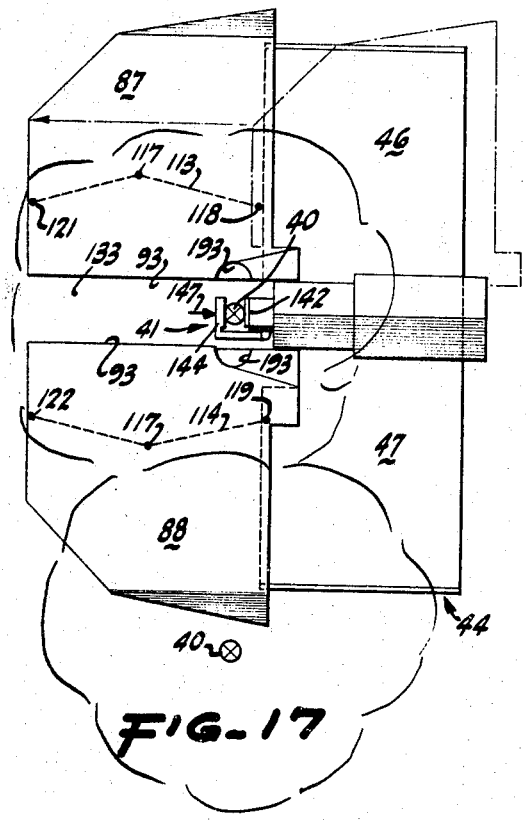
FIGURE 17 illustrates a sequence following FIGURE 16 with the shaker fully engaged with the tree and with both of the wings in laterally extended position; and, FIGURE 18 shows the wings in laterally extended and longitudinally closed position, with the shaker ready to commence the shaking operation.

Concurrently with the outward projection of the wings, a pair of wing supporting arms 113 and 114 underlying the wings 87 and 88, respectively, unbend about elbow joints 116 and 117, respectively (see FIGURES 2 and 17). The inner ends of the supporting arms 113 and 114 are pivoted to the frame as at 118 and 119, respectively, the outer ends being pivotally mounted on the outer wing edges 92, as at 121 and 122, respectively.

Retraction of the wings, contrariwise, is accompanied by a sharp bending of the elbows, as appears in FIGURE 15.

Figure 3:
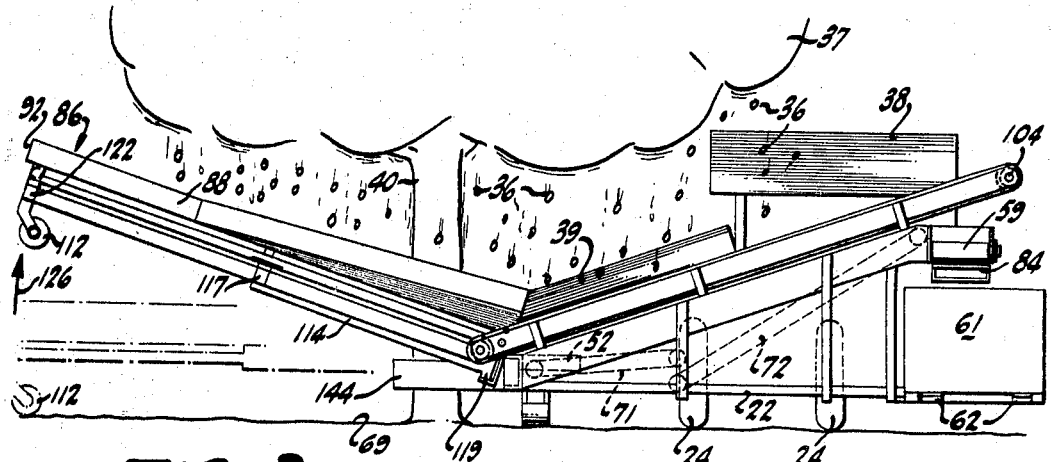
FIGURE 3 is a rear elevational view of the device located under a tree being shaken, showing the wings extended and inclined position.

Upon reaching their fully laterally extended position, the wings 87 and 88 are inclined upwardly, in the direction of the arrow 126, as shown in FIGURE 3.

This upward tilting movement is accomplished by the lifting structure illustrated most clearly in FIGURES 9 and 10. The pivot member 118, for example, to which the inner end of the forward bendable arm 113 is secured, is itself rockably journaled at its upper end on a frame bracket 128, the lower end of the pivot member 118 being pivotally mounted on a clevis 129 laterally translated by a plunger 131 and cylinder 132 pivotally mounted on the frame 22.

Outward extension of the plunger 131 causes the member 118 and the attached wing supporting arm 113 to tilt upwardly, as indicated in FIGURE 9; retraction of the plunger 131, on the other hand, results in lowering of the attached arm 113 and the wing 87. The after wing 88 is actuated in a similar fashion.

Approximately concurrently with the laterally outward extension of the wings 87 and 88 and the upward tilting thereof, as just described, the tree shaker mechanism 41 is brought into operation.

As will be realized, the operator will previously have maneuvered the vehicle alongside the tree, as closely as possible to the tree trunk 40, and with the tree trunk 40 in registry with the approximate transverse centerline of the vehicle. In performing this maneuver, the operator is greatly assisted by his central location on the vehicle. The operator, in other words, can sight down the center of the opening 133 (see FIGURE 15) between the wings 87 and 88 and stop the vehicle as the tree trunk 40 comes into alignment therewith.

Figure 16:
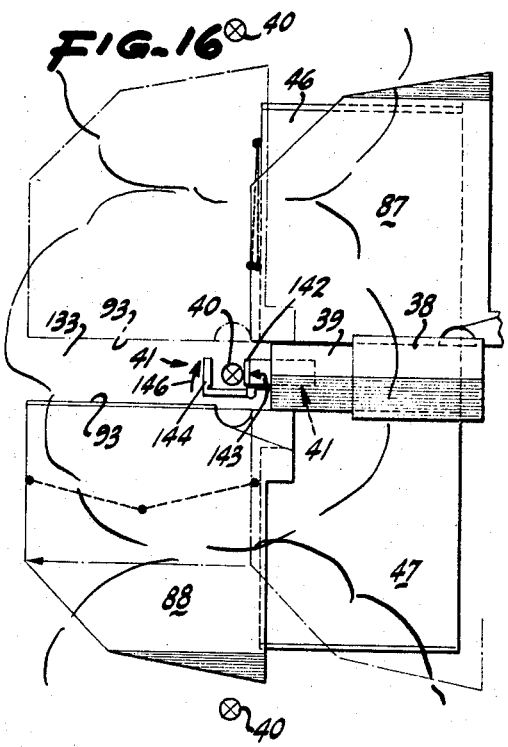
FIGURE 16 is an illustration comparable to FIGURE 15, showing the shaker in partially engaged position with respect to the tree.

Then, accompanying lateral extension and upward tilting of the wings, as previously described, the operator laterally translates the shaker 41, causing the inner jaw 142 (see FIGURE 16) of the shaker to move laterally in the direction of the arrow 143 into abutment with the tree trunk 40. This maneuver is followed by swinging the pivotally mounted outer jaw 144 around the trunk in the direction of the arrow 146, the outer jaw 144 being then moved inwardly in the direction of the arrow 147 (see FIGURE 17) into abutment with the trunk, thus securely gripping the tree trunk 40 between the two shaker jaws 142 and 144.

The shaker 41 can be of a conventional, commercially available variety, constructed substantially in the manner fragmentarily illustrated in FIGURES 12 through 14. The structural details of the shaker unit itself form no part of the present invention except insofar as they operate in combination with other components of the instant device. Inclusive of such components are novel and important mechanisms regulated from the operator's station to effect lateral in and out translation, or positioning, of the shaker as well as tilting thereof, to suit the particular tree.

As previously described, the shaker 41 includes an inner jaw 142 and an outer jaw 144. The outer jaw 144 is mounted on an arm 151 which is swingable about a pivot 152 under the urgency of a pivoted piston 153 and a cylinder 154 pivotally mounted on the shaker housing 156. Padding 157 and 158 on the jaws helps to protect the tree bark during shaking.

The shaker 41 includes, in well-known fashion, appropriate interior mechanism to effect vibration.

Supporting the shaker for lateral translation, and isolating the vibration thereof from the main framework, as well as permitting a certain degree of torsional movement about the shaker's axis, is a plurality of vertical rods 161 secured at their lower ends to flanges 162 on the shaker housing and attached at their upper ends to resilient pad members 163. The resilient pad members 163 are, in turn, secured to a substantially horizontal frame 164 laterally translated by a piston 166 and cylinder 167 secured to the main vehicle framework.

The slidable horizontal frame 164, together with the subjacent vibrationally isolated shaker 41, are readily and smoothly laterally translatable under urgency of the piston 166 by reason of the fact that the horizontal frame 164 is suspended by a plurality of anti-friction rollers 168. The rollers 168 are disposed within a spaced pair of parallel tracks 169, the track forming a portion of a truss structure 170 including a bar 171 rockably journaled at the bar's ends on the main vehicle framework 22 (see FIGURE 14).

In addition to the foregoing structure which enables the shaker to be selectively translated laterally into engagement with the tree trunk, and subsequently disengaged therefrom the platform 164 and the shaker 41 are also selectively tiltable about the fore and aft axis of the bar 171.

The tilting mechanism (see FIGURES 13 and 14) includes a cylinder 172 pivotally mounted at 173 on the main vehicle frame 22. Protruding from the cylinder 172 is a piston 174 pivotally attached to a bell-crank 176 and a pivoted lever 177 pivotally mounted on a bracket 178 secured to the frame 164.

By projecting the plunger 174, the bracket 178, and thus the inner end of the platform 164 is depressed, pivoting occurring about the axis of the bar 171 the effect being to tilt upwardly the shaker jaws 142 and 144 to conform to a tree trunk somewhat inclined toward, or leaning toward, the operator. By retracting the plunger 174, on the other hand, the jaws are tilted downwardly to grasp tightly a trunk which is somewhat inclined away from the operator.

As previously stated, the resilient pad members 163 not only assist in isolating shaker vibration but they also yield somewhat so that the jaws can securely grip a trunk which is slightly inclined in either a fore or an after direction, the shaker mounting in this case being slightly rotated, as in torsion, about its own longitudinal axis.

As will also be recognized, the upward and downward movement of the shaker made possible by the shaker mounting structure also enables the operator to locate the shaker jaws at the most desirable position on the tree trunk to effect maximum crop recovery.

Since the laterally extended wings 87 and 88 exert a rather substantial tipping movement, it has been found convenient to provide a wing support member 181 at a location below each of the longitudinal conveyors 51 and 52 (see FIGURES 6, 9 and 10). Pivotally mounted on a frame member 22 is a cylinder 183 and a projectable piston 184 pivotally mounted on a bell crank 186 including an elongated leg 187 terminating in a broad, arcuate foot 188 engageable with the ground 69 when support is desired. This wing support member is, in common with all other components, controllable by suitable control levers on the operator's console 30.

With the wings 87 and 88 in the laterally extended and upwardly inclined position, and with the shaker jaws appropriately engaged with the tree trunk, as appears most clearly in FIGURE 17, it is now only necessary for the operator to close the gap 133 between the two adjacent transverse wing edges 93 in order to commence the crop shaking operation.

This closure is accomplished by translating the leading wing 87 rearwardly in the direction of the arrow 191 (see FIGURE 18) and translating the after wing 88 forwardly as indicated by the arrow 192 until the two lateral edges 93 come into engagement, an overlap between the edges being preferably provided.

By so moving the wings, the tree trunk 40 is snugly lodged in the registering semi-circular recesses 193 (see FIGURE 17) in the adjacent inner corner areas of the wings, the recess walls being resilient so as to grip the trunk sufficiently tightly to prevent any of the crop from falling through to the ground below.

The mechanism used for longitudinally translating one wing is substantially identical to that used to translate the other. Consequently, a description of one will serve to described the other.

With especial reference to FIGURES 6, 7 and 8, it can be seen that the wing 87 includes a supporting framework including a plurality of transverse supporting battens 201, a longitudinal brace 202 connected by spacers 203 to an elongated sleeve 204 slidingly encompassing the longitudinal rod 100, and a plurality of lateral stiffening members 206.

Selectively sliding the sleeve 204 relative to the rod 100, and thus longitudinally translating the wing 87 in a fore and aft direction, is a hydraulic cylinder 211 mounted on the frame 22 and a plunger 212 mounted on a bracket 210 on an elongated square-in-section bar 213, the bar 213 being slidable within hollow, square-insection guide members 214 and 215 secured to the frame 22.

A vertical finger 216 upstanding from the slidable bar 213 engages a pair of tines 217 projecting from the sleeve 204 and thus transfers the translational movement of the plunger 212 and the bar 213 to the tubular sleeve 204 and thus to the wing 87 attached to the tube 204. As shown in FIGURE 8, engagement between the finger 216 and the tines 217 occurs only when the wing is in projected and inclined position.

The structure shown in full line in FIGURE 6 illustrates the wing 87 in its aftermost position, that is to say, with the wing in the position it assumes preparatory to and during shaking of the tree.

After shaking is completed, the wing 87 is moved into its forward most position by projecting the piston 212. Helping to retain the wing 87 in said forwardmost position and to assume registry between the finger 216 and the tines 217 as the wing is extended and inclined on the next cycle of operation is a latch mechanism 221 comprising a latch lever 222, indexing the wing. The lever is pivotally mounted on the adjacent one of the spacer bars 203, the distal end being formed into a low-profile, U-shaped head 223, or detent cam, biased downwardly by a compression spring 224 (see FIGURE 6).

Latchably engageable with the cam head 223 in the forwardmost position of the wing 87 is a cam ring segment 231 (see FIGURES 6 and 7) disposed around a portion of the periphery of a collar 232 encompassing the longitudonal rod 100 and connected to the adjacent one of the traveling blocks 101.

FIGURE 6 illustrates, in outline, the position of the latching mechanism in the forwardmost latched and indexed position of the wing 87. As the wing is moved toward the right hand direction in FIGURE 6, by retracting the piston 212, the U-shaped head 223 is cammed upwardly over the cam ring 231, thus releasing the latch pin 222.

Figure 18:
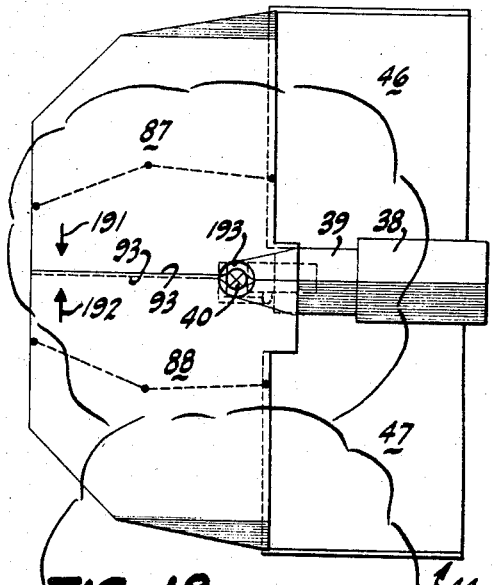

After the respective components have assumed the position shown in FIGURE 18, the shaker is actuated and the crop falls onto the subjacent catching surfaces which preferably, are of a resilient material, such as rubber-coated canvas, or a plurality of spaced, parallel bands of yielding fabric overlying a resilient sheeting.

The inclined movable wings 87 and 88 and the inclined stationary apron 44 direct the crop toward and onto the longitudinal conveyor members and thence into the collecting bin 61 for periodic removal.

After shaking is completed, the wings 87 and 88 are again separated longitudinally, the shaker is disengaged from the tree trunk and moved into retracted location, the wings are lowered and laterally retracted and the vehicle is promptly moved ahead to the next tree where the cycle is repeated.

It has been found that the time required for effecting the foregoing operation, including the move from one tree to the next is very fast, being on the order of 60 to 120 seconds, depending upon the proficiency of the operator.

It can therefore be seen that I have provided a combination crop shaker and harvester unit which operates quickly and efficiently, yet which requires but a minimum of operating personnel.

What is claimed is:

1. A combined crop shaker and harvester comprising.
  (a) an elongated framework supported on ground engaging wheels for movement alongside a row of crop bearing trees;
  (b) a fixed, fore and aft crop catching apron on said framework extending longitudinally from a forward end to an after end and extending laterally downwardly from a high side located on one side of said framework to a low side located on the other side of said framework and adjacent the line of the tree row, said fixed apron being effective to intercept a first portion of a crop shaken from a tree in the tree row with the tree located substantially longitudinally centrally of said low side of said apron;
  (c) a pair of movable wings carried by said framework, said wings being slidably mounted on said framework for movement between a first retracted position overlying said fixed apron and a second laterally extended position with one of said wings located forward of the tree and the other of said wings located aft of the tree, said wings also being pivotally mounted on said framework for movement to a third upwardly inclined position substantially in mirror symmetry with respect to the inclination of said fixed apron, said wings being effective to intercept the second remaining portion of the crop shaken from the tree;
  (d) an operator's station mounted substantially centrally on said framework; and,
  (e) a tree shaker mounted on said other side of said framework adjacent said operator's station, said shaker including a horizontal shaker frame slidably mounted on said framework for transverse movement toward and away from the tree, the path of said transverse movement of said shaker frame being in substantial transverse alignment with said operator's station.

2. An apparatus as in claim 1 including self-propelling machinery.

3. An apparatus as in claim 2 further including means at said operator's station for controlling the movement of said self-propelling machinery, said wings and said shaker.

4. A device as in claim 1 further including means connecting said wings and said framework for translating said wings longitudinally toward each other into substantially edge to edge engagement and snugly encompassing the tree, and longitudinally away from each other a distance sufficient to clear the tree trunk as said wings are subsequently moved from said second laterally extended position toward said first retracted position overlying said fixed apron and from said first position toward said second position.

5. A device as in claim 4 further including conveyor means on said framework for receiving and transporting said first and said second harvested portions of said crop away from the lower margins of said inclined fixed apron and said inclined movable wings.

6. A device as in claim 5 further including bin supporting and handling means carried by said framework at a location below the elevation at which said conveyors discharge the crop, and blower means on said framework for blowing air horizontally toward the mixture of crop and unwanted trash material falling vertically by gravity from said elevation, thereby effecting preliminary separation of the unwanted trash material.

7. A device as in claim 6 further including a canopy on said framework above said operator's station to deflect the portion of the crop falling on said canopy away from said operator's station and onto said fixed apron.

8. A device as in claim 1 including resilient means for supporting said shaker to afford limited degrees of freedom of motion about the to and fro path of said shaker and about an axis transverse to said path of said shaker.

9. A device as in claim 1 wherein said shaker frame is pivotally mounted on said framework for tilting movement about a fore and aft axis, and including means for controlling the extent of tilt of said shaker frame.

References Cited

UNITED STATES PATENTS

| | | | |
|---|---|---|---|
| 1,626,068 | 4/1927 | Bartlett | 56—328 |
| 3,105,347 | 10/1963 | Anderson et al. | 56—329 |
| 3,121,304 | 2/1964 | Herbst | 56—328 |
| 3,145,521 | 8/1964 | Herbst | 56—329 |
| 3,338,040 | 8/1967 | Shipley | 56—328 |

RUSSELL R. KINSEY, Primary Examiner